United States Patent [19]

Matsubara et al.

[11] Patent Number: 5,473,405
[45] Date of Patent: Dec. 5, 1995

[54] SHIELDING BLADES FOR TTL MULTI-PATTERN LIGHT ADJUSTMENT PREVENTING LIGHT LEAKAGE BETWEEN CURTAINS

[75] Inventors: Takashi Matsubara; Masanori Hasuda, both of Yokohama, Japan

[73] Assignee: Nikon Corporation, Tokyo, Japan

[21] Appl. No.: 392,415

[22] Filed: Feb. 22, 1995

Related U.S. Application Data

[63] Continuation of Ser. No. 92,481, Jul. 16, 1993, abandoned.

[30] Foreign Application Priority Data

Jul. 21, 1992 [JP] Japan .................................. 4-193637
Apr. 28, 1993 [JP] Japan .................................. 5-102192

[51] Int. Cl.⁶ .................................................. G03B 9/40
[52] U.S. Cl. ......................... 354/431; 354/480; 354/246
[58] Field of Search .............................. 354/480, 432, 354/431, 250, 246, 249

[56] References Cited

U.S. PATENT DOCUMENTS

| | | | |
|---|---|---|---|
| 4,065,777 | 12/1977 | Maitani et al. | 354/480 |
| 4,459,007 | 7/1984 | Nemoto et al. | 354/480 X |
| 4,797,699 | 1/1989 | Nemoto et al. | 354/250 X |
| 4,926,202 | 5/1990 | Fukuda et al. | 354/250 X |
| 5,231,448 | 7/1993 | Sato et al. | 354/431 |

*Primary Examiner*—W. B. Perkey
*Attorney, Agent, or Firm*—Oliff & Berridge

[57] ABSTRACT

According to one aspect of the present invention, a focal plane shutter of a camera for conducting TTL multi-pattern light adjustment is provided that comprises a plurality of shielding blades for covering an aperture in a developed position. Each of the shielding blades has at least one edge thereof overlapped by one of the shielding blades immediately adjacent thereto in the developed position, the overlapped edge having a predetermined minimum overlap width. Each of the shielding blades has the lens-side surface thereof formed to be light-reflective having a rate of diffused reflection. The rate of diffused reflection is set within a range according to the predetermined minimum overlap width, such that TTL multi-pattern exposure is enabled and light leakage between the shielding blades does not occur.

9 Claims, 4 Drawing Sheets

BLADES FOR A FRONT CURTAIN

Fig.4

BLADES FOR A FRONT CURTAIN

SHIELDING BLADES FOR TTL MULTI-PATTERN LIGHT ADJUSTMENT PREVENTING LIGHT LEAKAGE BETWEEN CURTAINS

This is a continuation of application Ser. No. 08/092,481, filed Jul. 16, 1993, now abandoned.

BACKGROUND OF THE INVENTION

1. Field of The Invention

The present invention relates to a focal plane shutter of a camera conducting Through-The-Lens (TTL) multi-pattern light adjustment, that prevents light leakage between curtains.

2. Related Background Art

Conventional cameras capable of ordinary TTL light adjustment, have encountered exposure results of photographing that are widely dispersed depending on conditions of a subject since such cameras have the quantity of flashing light controlled so that the average value of exposure light across a specific area of film surface from which a photoreceptor device can receive lights, reaches a predetermined level when flashing light is adjusted.

For example, in the case of a camera where a photoreceptor device can receive lights from the area equal to the entire exposure area of the film surface, if a photograph is taken using light flashing in a field where a main subject occupies a small area and the background of the main subject constitutes a wide space, the portion that does not reflect the flashing light becomes wide, so that the quantity of flashing light so controlled may cause over-exposure for the main subject.

On the other hand, if a photograph is taken using light flashing in a field where an object of a high rate of reflection such as a gold-leafed folding screen is standing right behind a main subject in the case of the same cameras as above, the quantity of flashing light so controlled may cause, in contrast, under-exposure for the main subject.

To solve this problem, a TTL automatic light adjustment control device has been proposed as means for eliminating dispersion in the light exposure for a main subject due to difference between conditions of factors for subjects in the subject field such as the location and rate of reflection for such subjects in photographing using light flashing.

The automatic control device has a plurality of photoelectric means disposed at positions where the photoelectric means can receive lights reflected by the film surface, the plurality of photoelectric means each being capable of measuring the light reflection intensity from each of regions of the subject field obtained by dividing the subject field into one single central region and a plurality of peripheral regions.

Then, preliminary flashing of the flashing device is activated immediately before the focal plane shutter of the camera is opened so that the preliminary flashing light is firstly reflected by the subjects, as the image of the subjects, onto the lens-side surface of the shutter curtain of the focal plane shutter through the lens. The first reflected preliminary flashing light is secondly reflected by the lens-side surface of the shutter curtain of the focal plane shutter, then received and processed by the plurality of photoelectric means corresponding to the respective regions of the subject field.

The automatic control device integrates the light reflection intensity values outputted from each of the plurality of photoelectric means, and outputs these integrations as the detected values for the subject field rates of reflection based on the preliminary flashing light for the respective regions of the subject field.

Thus, the degree of weighting, or the weighting coefficient for each divided region of the subject field is determined such that the determined weighting coefficients enable an optimal exposure to be obtained for the main subject, by integrating computing the detected information on the rates of reflection for the respective regions of the subject field.

Successively, main flashing of the flashing device is activated immediately after the focal plane shutter of the camera is opened so that the reflected main flashing light is received and processed by the same plurality of photoelectric means as described above.

The automatic control device weights the light reflection intensity values of the main flashing that is outputted from the plurality of photoelectric means, with the weighting coefficient predetermined as described above.

The automatic control device then sums up and integrates the weighted outputs, and compares the integrated values of the weighted outputs with predetermined values. Thus, the automatic control device ceases the main flashing according to timing determined by such comparison, thereby completing the light adjustment of the main flashing. Such system of light adjustment is referred to as the "TTL multi-pattern light adjustment."

A focal plane shutter for the TTL multi-pattern light adjustment comprises four to five shielding blades and a driving mechanism therefor.

To conduct TTL multi-pattern light adjustment stably, it is effective to have an arrangement where the lens-side surface of shielding blades of a focal plane shutter is adapted to have a high rate of diffused reflection so that more reflection light strikes the plurality of photoelectric means described above. Thus, a focal plane shutter was fabricated with the lens-side surface of shielding blades thereof formed to have a high rate of diffused reflection, and was assembled into a camera capable of TTL multi-pattern light adjustment for photographing. With this arrangement, though no problems occurred in ordinary photographing, light leakage problems were encountered that light leaks through gap between overlapped edge regions of immediately adjacent and mutually overlapping shielding blades (hereinafter referred to as "light leakage between curtains"), thereby causing the film to be exposed adversely.

SUMMARY OF THE INVENTION

An object of the present invention is to prevent light leakage between curtains in a focal plane shutter of a camera capable of TTL multi-pattern light adjustment.

One cause for light leakage between curtains is considered to be related to two factors, namely, the overlap width of the overlapped edge regions of the shielding blades, particularly the minimum overlap width of the overlapped edge regions which are opposed to an aperture of a camera, and the rate of diffused reflection on the overlapped edge regions. For example, in the case where the shielding blades are made smaller to obtain a higher shutter speed, thereby resulting in smaller overlapped edge regions, if a surface having a high rate of diffused reflection is formed on the overlapped edge regions, light leakage may be thought to occur between curtains.

Furthermore, in the TTL multi-pattern light adjustment, in addition to the main flashing light, the preliminary flashing light joins the light-reflecting system, whereby the light-shielding performance is relatively deteriorated, compared to the conventional case where ordinary photographing light only is taken into consideration, which is also considered to be a cause for light leakage between curtains.

According to one aspect of the present invention, a focal plane shutter of a camera for conducting TTL multi-pattern light adjustment, which controls a quantity of light to an aperture of the camera is provided that comprises a plurality of shielding blades for covering the aperture in a developed position, each having at least one edge thereof overlapped by one of the shielding blades immediately adjacent thereto in the developed position, the overlapping edge having a predetermined minimum overlap width in a region opposed to the aperture. Each of the shielding blades each has the lens-side surface thereof formed to be light reflective having a rate of diffused reflection. The rate of diffused reflection is set within a range according to the predetermined minimum overlap width, such that TTL multi-pattern light adjustment is enabled and no light leakage between the shielding blades occurs. For example, a focal plane shutter having the plurality of shielding blades as described above is provided that the rate of diffused reflection of the lens-side surface of the plurality of shielding blades is within a range of 7 to 22%, and the predetermined minimum overlap width is not less than 2.6 mm and not more than 4.5 mm. Furthermore, for example, a focal plane shutter having the plurality of shielding blades as described above is provided that the rate of diffused reflection of the lens-side surface of the plurality of shielding blades is within a range of 7 to 15%, and the predetermined minimum overlap width is not less than 1.5 mm and less than 2.6 mm. Furthermore, for example, a focal plane shutter having the plurality of shielding blades as described above is provided that the rate of diffused reflection of the lens-side surface of the plurality of shielding blades is within a range of 7 to 11%, and the predetermined minimum overlap width is not less than 1.5 mm and less than 2.6 mm. And furthermore, for example, a focal plane shutter having a plurality of shielding blades as described above is provided that each of the shielding blades has the film-side surface thereof formed to be light-reflective having a rate of diffused reflection, the rate of diffused reflection of the film-side surface being set at not more than 6%.

According to one aspect of the present invention, since the rate of diffused reflection of the lens-side surface of the plurality of shielding blades is set according to the minimum overlap width of the immediately adjacent shielding blades, light leakage between the shielding blade can be effectively prevented according to needed shutter performance, and, at the same time, reflected light of preliminary flashing can be obtained that is enough to conduct TTL multi-pattern light adjustment.

Also, according to another aspect of the present invention, even in the case where the quality of the shielding blades varies, particularly, the shielding blades warp in various degree, and therefore a gap between the surfaces of the shielding blades which are adjacent to each other becomes broader by assembling the shielding blades, which warp to a considerable extent, in the focal plane shutter, light leakage between the shielding blades can be effectively prevented. Furthermore, since the rate of diffused reflection of the film-side surface of the plurality of shielding blade is set at not more than 6%, light leakage between the shielding blades can be prevented more effectively even if the gap between the surfaces of the shielding blades is broad. As a result, range of warp degree of the shielding blade which is allowable to be assembled in the focal plane shutter may become broader, and consequently, the reduction in cost can be achieved. Specifically, the rate of diffused reflection of the film-side surface of the shielding blade is preferred to be set at not more than 5%.

Plate member for the shielding blades may be made of FRP, light metal such as Ti (Titanium), Al (Aluminum) alloy, plastics, or light weight ceramics.

FRP, or Fiber-Reinforced Plastics, comprises fiber and matrix resin. Kinds of fiber that may be used as the fiber for FRP are either continuous aromatic polyamide fiber or continuous ultra high molecular weight polyethylene fiber, besides continuous fiber of carbon fiber. Particularly for the intermediate layer, fiber other than carbon fiber may be used. For the intermediate layer in a three-layer construction (the three layers comprising a front surface layer, an intermediate layer, and a back surface layer), short fiber may be used instead of continuous fiber.

Kinds of resin that may be used as the matrix resin for FRP are either (1) thermoplastic resin such as celluloid, cellulose acetate, cellulose propionate, cellulose butyrate, 6-nylon, 6.6-nylon, ABS (Acrylonitrile-Butadiene-Stylene) resin, AS (Acrylonitrile-Stylene) resin, high density polyethylene, polypropylene, polyacetal, polycarbonate, polyethylene terephthalate, polybutylene terephthalate, polyether ketone, polyether etherketone, polysulfone, polyether sulfone, polyether imide, polyallylate, polyamide elastomer, ionomer, crystal liquid polymer, polyimide, polyamide imide, fluororesin, PPS (PolyPhenylene-Sulfide), denatured polyphenylene oxide; or (2) thermoset resin such as epoxy resin, unsaturated polyester resin, polyurethane, and polyimide.

In the case where carbon fiber is used, FRP is provided with light shielding capability to some extent due to black color of carbon fiber. In order to increase light shielding capability, however, carbon black may be dispersively added beforehand into resin liquid that constitutes precursor of matrix resin, when prepreg sheet is fabricated. Here, the prepreg sheet is formed by impregnating reinforcement fibers with a thermoset resin liquid, e.g., uncured liquid of an epoxy resin or unsatured polyester, which is a precursor of the matrix resin, and transforming the resin liquid to B stage in which the resin has been cured to extinguish fluidity but is still curable finally by application of heat.

Otherwise, a special resin liquid may be separately prepared by mixing with a high concentration of carbon black, so that the special resin liquid so prepared may be penetrated under pressure into ordinary prepreg sheet by using an applicator such as an roll coater. Carbon black also has an effect of increasing lubricity or slippery smoothness of the surface of the shielding blade, resulting in lesser abrasion of the surface of the shielding blades even when the shielding blades are rubbing each other.

Carbon black for this use is preferred to have an average grain diameter of less than 0.07 micron (μm), particularly less than 0.01 micron. A preferred mixing ratio of carbon black is within a range of 3 to 15 weight percent to resin liquid having 100 weight percent of solid. If the ratio is 15 weight percent or over, fiber orientation becomes deteriorated, so that flatness is adversely affected; fluidity of the liquid resin becomes also decreased, so that holes may appear inside and peeling may occur between layers.

An appropriate resin percentage in prepreg sheet may be 30 to 50 weight percent, particularly 38 to 48 weight percent. If resin percentage is less, holes and fine cracks occur in appearance, and paintability decreases; furthermore, unevenness appears on the material surface, so that abrasion resistance and lubricity of the shielding blade decreases, and besides, appearance becomes deteriorated. In addition, such less resin percentage may results in streaks on the surface when resin is cast in, which may also deteriorate appearance.

Surface density of fiber in prepreg sheet that specifies fiber quantity in gram contained in one square meter of the sheet, may be 10 to 60 g/m$^2$. Each layer of prepreg sheet may be 15 to 70 micron thick. All the prepreg sheet layers need not having a same thickness. Prepreg sheet layers of various layer thicknesses and surface densities of fibers can be combined if such layers are used to be plane symmetric in the direction of thickness with respect to the neutral or central plane of the shielding blade. If the layer thicknesses fall within the specified thickness range, the thickness and surface fiber density of the intermediate layer may be advantageously made greater than those of one surface layer (either one of the front and back surface layers) to increase flexural rigidity in total.

Prepreg sheet may be formed to be a plate member, first by laminating at least three, for example, three, four, or five, layers so that the orientation of fiber in the surface layer is orthogonal or substantially orthogonal with that of the intermediate layer, and so that the surface and intermediate layers are plane symmetric in the direction of thickness to the neutral plane of the shielding blade, and then by heating and press-forming the plate member. Thus, thermosetting resin liquid yet to be hardened is solidified by crosslinking. In this way, plate member made of FRP, 50 to 120 micron thick, is obtained for the shielding blade.

Figure 1:
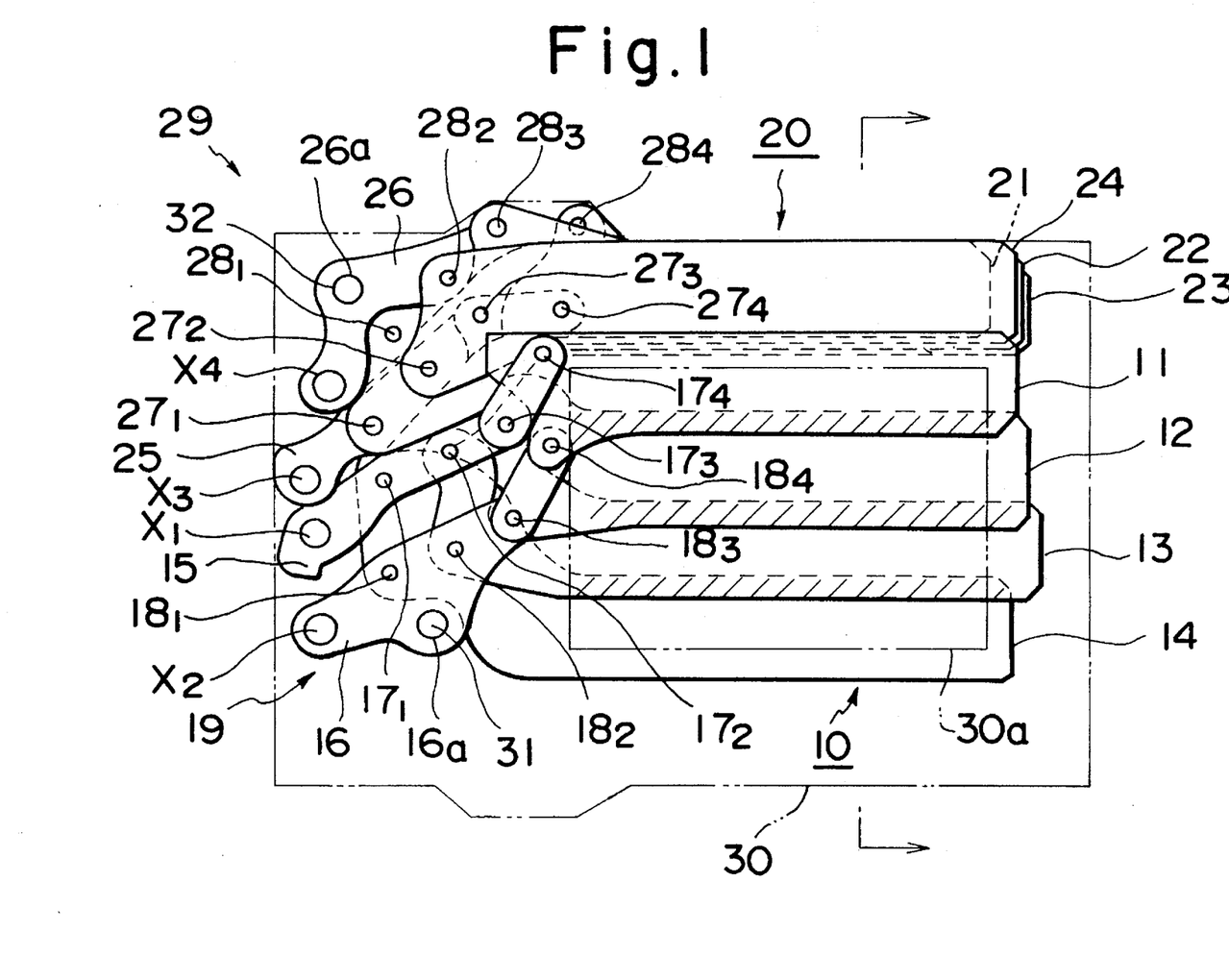
FIG. 1 is a front view of a first embodiment of focal plane shutter according to the present invention, showing the front curtain being developed to cover the exposure aperture.
Figure 2:
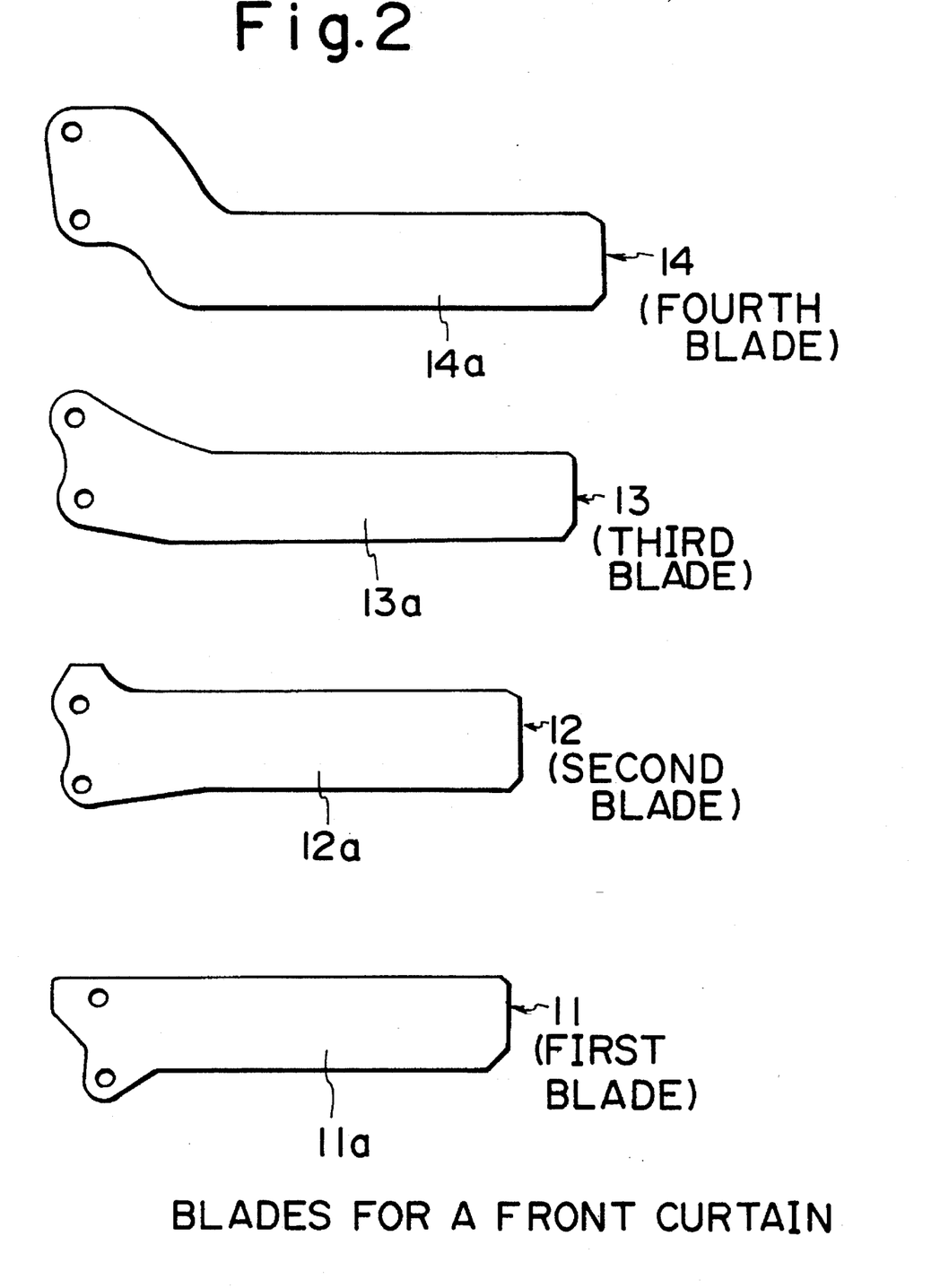
FIG. 2 is a disassembled view of each of the shielding blades constituting the front curtain of the focal plane shutter;according to the first embodiment shown in FIG. 1.

Specified shapes of shielding blades, as shown in FIGS. 1 and 2, are then punched out of various plate member so formed. Specifically, around twenty to forty shielding blades are punched out of one plate member. In case of FRP, the punching is conducted so that the orientation of continuous fiber in the surface layer is aligned to the longitudinal direction of the shielding blade. In punching, it is common to punch holes for inserting connecting pins, out of the shielding blade at the same time.

Shielding blades according to claim 1 to 4 of the present invention, have the lens-side surface provided with a rate of diffused reflection being set within a range such that TTL multi-pattern exposure is enabled and light leakage between curtains does not occur, according to the minimum overlap width of the immediately adjacent shielding blades in a region opposed to the aperture of the camera. To obtain a shielding blade having such construction, the shielding blade may comprise a material having high reflection rate of surface, for example, light metal such as Ti (Titanium) and Al (Aluminum) alloy. Alternately, the shielding blade may comprise a material having low reflection rate of surface, for example, FRP or plastics, and then, processing for providing with high reflection rate of surface is applied to the lens-side surface of the shielding blade. For providing with high reflection rate, for example, high reflection rate surfacing painting, or, whitening painting, may be applied.

Shielding blades according to claims 5 to 7 of the present invention, have the lens-side surface provided with a relatively high rate of diffused reflection compared with that of the film-side surface thereof (hereinafter referred to as "high reflection rate surface"), and have the film-side surface provided with a relatively low rate of diffused reflection compared with that of the lens-side surface thereof (hereinafter referred to as "low reflection rate surface").

To obtain a shielding blade having such construction, the punched shielding blade is processed in a manner that, for example, high reflection rate surfacing processing (processing for providing with high reflection rate surface) is applied to the lens-side surface and/or low reflection rate surfacing processing is applied to the film-side surface. In the process, the shielding blade may be made comprising material having high reflection rate surface, for example, light metal such as Ti, and Al alloy, and then, low reflection rate surfacing processing is applied to the film-side surface of the shielding blade. Alternately, the shielding blade may be made comprising material having low reflection rate surface, for example, FRP or plastics, and then, high reflection rate surfacing processing is applied to the lens-side surface of the shielding blade. For low reflection rate surfacing processing, for example, low reflection rate surfacing painting, or blackening painting, may be applied. For high reflection rate surfacing processing, for example, high reflection rate surfacing painting, or whitening painting, may be applied.

It is noted that, though the surface with high reflection rate surfacing painting may look rather gray than white to the naked eye depending on the rate of diffused reflection of the surface, colors resulting from high reflection rate surfacing painting as described above, including the gray-looking color, may be hereunder referred to as "white."

The painting may be advantageously applied in a manner that low reflection rate surfacing painting is applied to the film-side surface after high reflection rate surfacing painting is applied to the lens-side surface, which results in low reflection rate surfacing painting being applied to the edge surface of the shielding blade, a preferable condition for preventing light leakage between curtains. It is further desired that those high reflection rate surfacing painting and low reflection rate surfacing painting are provided with surface lubricity and abrasion resistance.

Recently, there has been a demand for higher shutter speeds and higher flash synchro speeds due to increased film sensitivity and desire for new image expression, whereby cameras have been provided that implemented a high shutter speed as high as 1/8000 sec. and a flash synchro speed of 1/250 sec.

In focal plane shutters of such high speed, a high shutter speed beyond a flash synchro speed is implemented by a method of slit exposure that the front and rear curtains are started moving with a temporal gap between the starting times thereof, and the width of spatial gap, or slit, between the front and rear curtains, is either fixed to a predetermined value or varied in accordance with the speed.

In the case where paint coating unevenness or burr caused by punching exists on a slit-side edge surface of the shielding blades forming a slit, undesired unevenness of exposure is likely to occur during the slit exposure. As a countermeasure, the edge surface of the shielding blades forming the slit may be lightly ground. Grinding can be classified into, for example, lapping, polishing and smoothing, according to roughness of the ground surface. Grinding can be also classified into grinding with fixed abrasive grain such as emery paper and water-proof abrasive paper, and grinding with free abrasive grain, according to grinding means.

The problem of unevenness of exposure during the slit exposure can be eliminated by grinding. Such grinding may be done in a manner of grinding each of shielding blades separately with fine water-proof abrasive paper of grain fineness number greater than No. 80, preferably greater than No. 400, or in a manner of grinding several shielding blades set together in a jig, with a grinding or lapping machine. When grinding the paint coated portion, finer abrasive material or paper is desired to be used since using coarse abrasive material or grain makes it difficult to secure stabilized quality.

When painting is applied to the shielding blades, grinding may be done preferably after painting, though grinding is possible both before and after painting. This is because ultimate surface unevenness can be smoothed if grinding is done after painting. For avoiding deviation in the dimensions of a shielding blade, grinding may be done preferably rather within the thickness of paint coating, in whole or in part, than beyond the thickness of paint coating into the original shielding blade thickness.

In the case where the whole thickness of paint coating is ground off the slit-side edge surface of the shielding blade, either undercoating (whitening paint coating) or unpainted blade surface, as case may be, is exposed. If the exposed undercoating (whitening paint coating) or unpainted blade surface has a high rate of diffused reflection, unevenness of exposure is likely to occur. To eliminate this, it is preferred that smooth coating of blackening paint is applied to the slit-side edge surface of the shielding blade.

Occurrence of unevenness of exposure depends on the slit width, besides surface unevenness. For example, if the slit width is 0.5 to 0.9 mm when exposure starts, and protuberances or dents greater than 20 to 40 micron dia., or 20×20 to 40×40 micron square exist, unevenness of exposure may occur, whereby grinding to decreased unevenness not greater than 30 micron, particularly not greater than 20 to 10 micron is preferred.

The thickness of painting film in high reflection rate surfacing painting or low reflection rate surfacing painting, after dried and hardened, may be typically 0.1 to 10 micron, preferably 3 to 6 micron, since a thicker coating may cause warp in the shielding blade.

DETAILED DESCRIPTION OF THE PREFERRED EMBODIMENTS

Referring to the attached drawings, the present invention will be described in detail hereunder according to certain preferred embodiments.

[First Embodiment]

As shown in FIG. 1, the focal plane shutter of this first embodiment of the present invention comprises a front curtain 10, a rear curtain 20, and a shutter base plate 30.

The front curtain 10 comprises four divided blades or shielding blades 11–14. As shown in FIG. 2, each of the four divided blades 11–14 is referred to as a first blade 11, a second blade 12, a third blade, and a fourth blade 14. Arms 15, 16 for respectively supporting the divided blades 11–14, are rotatably connected to shafts $X_1$, $X_2$ that are secured to the shutter base plate 30. The divided blades 11–14 are each rotatably connected to the arms 15, 16 by means of pins $17_4$-$17_1$ and pins $18_4$-$18_1$.

Attached to a hole 16a of the arm 16 is a driving shaft 31, which operates to open and shut the front curtain 10, in other words, to develop and retract the divided blades 11–14 by driving force provided by a well known shutter driving unit (not shown) when the shutter is driven.

The rear curtain 20 is also comprises four divided blades 21–24. Arms 25, 26 for respectively supporting the divided blades 21–24, are rotatably connected to shafts $X_3$, $X_4$ that are secured to the shutter base plate 30. The divided blades 21–24 are each rotatably connected to the arms 25, 26 by means of pins $27_4$-$27_1$ and pins $28_4$-$28_1$.

Attached to a hole 26a of the arm 26 is a driving shaft 32, which operates to open and shut the rear curtain 20 by driving force provided by a well known shutter driving unit (not shown) when the shutter is driven.

These arms 15, 16, 25, 26, shafts $X_1$-$X_4$, pins 17, 18, 27, 28, and driving shaft 31, 32 constitute driving mechanisms 19, 29 for moving the dividing blades 11–14, 21–24 respectively.

In FIG. 1, the reference numerals 30a represents an aperture of the camera.

Now, the front curtain 10 of this embodiment will be discussed more in detail.

Figure 3:
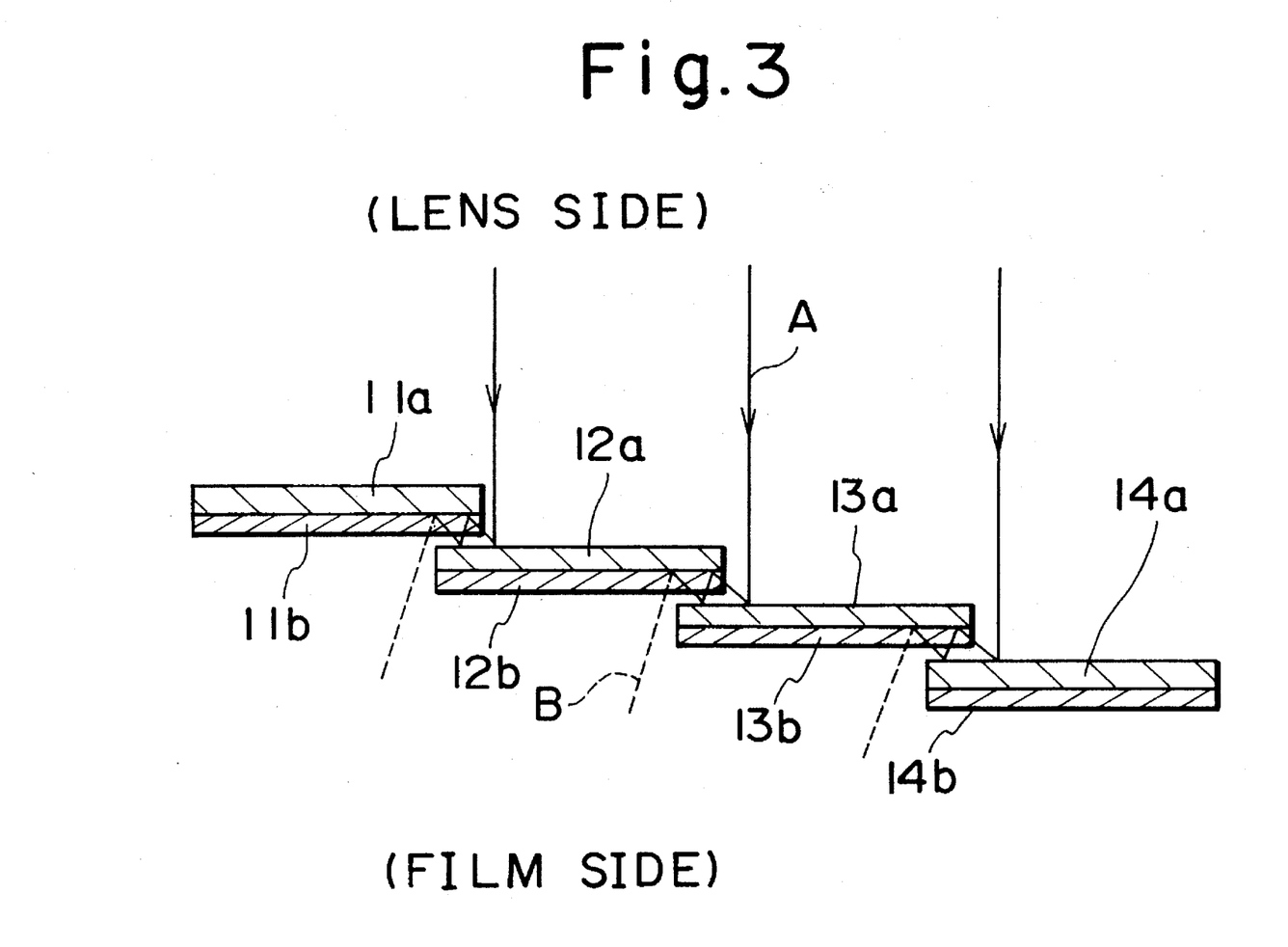
FIG. 3 is a schematic sectional illustration, as expanded in the direction of thickness, of the shielding blades constituting the front curtain of the focal plane shutter according to the first embodiment shown in FIG. 1.

As shown in FIGS. 1–3, provided on the lens-side surface of the divided blades 11–14 of the front curtain 10 are high reflection rate surfaces 11a–14a for responding to TTL automatic light adjustment control device (not shown). For more effective prevention of light leakage between curtains, low diffused reflection rate surfaces 11b–14b implemented, for example, by blackening painting, are provided on the film-side surfaces of the divided blades 11–14 of the front curtain 10.

In this first embodiment, the divided blades 11–14 are made of metallic material such as Ti or Al, or FRP. In preparing the divided blades, first, whitening painting, 3–6 micron thick, was applied to one surface, in whole, of each of the divided blades 11–14 that constitutes the lens-side surface of the divided blades to form the high reflection rate surfaces 11a–14a. Then, blackening painting, 3–6 micron thick, was applied to the film-side surface of the divided blades 11–14 to form the low diffused reflection rate surfaces 11b–14b. In this case, the blackening painting was also applied to the edge surfaces of the divided blades.

When applied to the film-side surface of the divided blades 11–14, the blackening painting may be desirably prevented from extending beyond the edge surface onto the whitening paint coated lens-side surface of the divided blades, either by covering the whitening paint coated lens-side surface using a jig dedicated to the blackening painting, or by devising a special painting method. More preferably, however, a narrow region on the lens-side surface, immediately adjacent to the edge surface and not more than 1 mm in width, may have the blackening painting applied thereto, for more effective prevention of light leakage between curtains.

After the painting was applied, the edge surfaces of the divided blades were respectively lightly ground with emery paper of grain fineness number 150 or 400, 600, and 1200. By doing this, protuberances or dents greater than 20 micron dia. or 20×20 micron square on the slit-forming surface of the divided blades were removed. It is noted that tens of the divided blades may be ground together by using dedicated jig. Grinding under a fixed pressure for seconds to tens of seconds is also possible by using a grinding or lapping machine. Alternately, grinding may be done only to the first (divided) blade 11 that has the greatest momentum among all the divided blades, besides, not to all the edge surfaces but only to the slit-forming edge surface of the first blade 11.

As shown in FIG. 3, in the focal plane shutter of this first embodiment, light A incident to near the overlapped edge region of a divided blade, or shielding blade, 13a from the lens side, is gradually absorbed through multi-reflection in the overlapped edge region, whereby the light leakage B between curtains experienced before, as shown in FIG. 3 in broken lines, can hardly occur.

Specifically, when the minimum width of the overlapped edge regions which is opposed to the aperture 30a of the shielding blades is not less than 2.6 mm and not more than 4.5 mm, the rate of diffused reflection on the whitened high reflection rate surfaces 11a–14a, or the lens-side surface of the shielding blades is made 7–22%, whereby light A incident from the lens side can be effectively attenuated, and light leakage between curtains can be effectively prevented.

Furthermore, when the minimum width of the overlapped edge regions which is opposed to the aperture is not less than 1.5 mm and less than 2.6 mm, light leakage between curtains can be effectively prevented by setting the rate of diffused reflection on the high reflection rate surfaces 11a–14a at 7–15%. Particularly, when the rates diffused reflection on the high reflection rate surfaces 11a–14a and the low reflection rate surfaces 11b–14b are within a range of 7–11% and not more than 6% respectively, light leakage between curtains can be effectively prevented by setting the minimum width of the overlapped edge region which is opposed to the aperture 30a at not more than 3 mm, preferably at not less than 1.5 mm.

In this first embodiment, light leakage between curtains is enabled to be further effectively prevented by setting the rate of diffused reflection on the low reflection rate surfaces 11b–14b on the film side of the shielding blades at not more than 6%. Even if the rate of diffused reflection on the low reflection rate surfaces 11b–14b is more than 6%, light leakage between curtains can be effectively prevented if the other conditions described above are satisfied.

[Second Embodiment]

Figure 4:
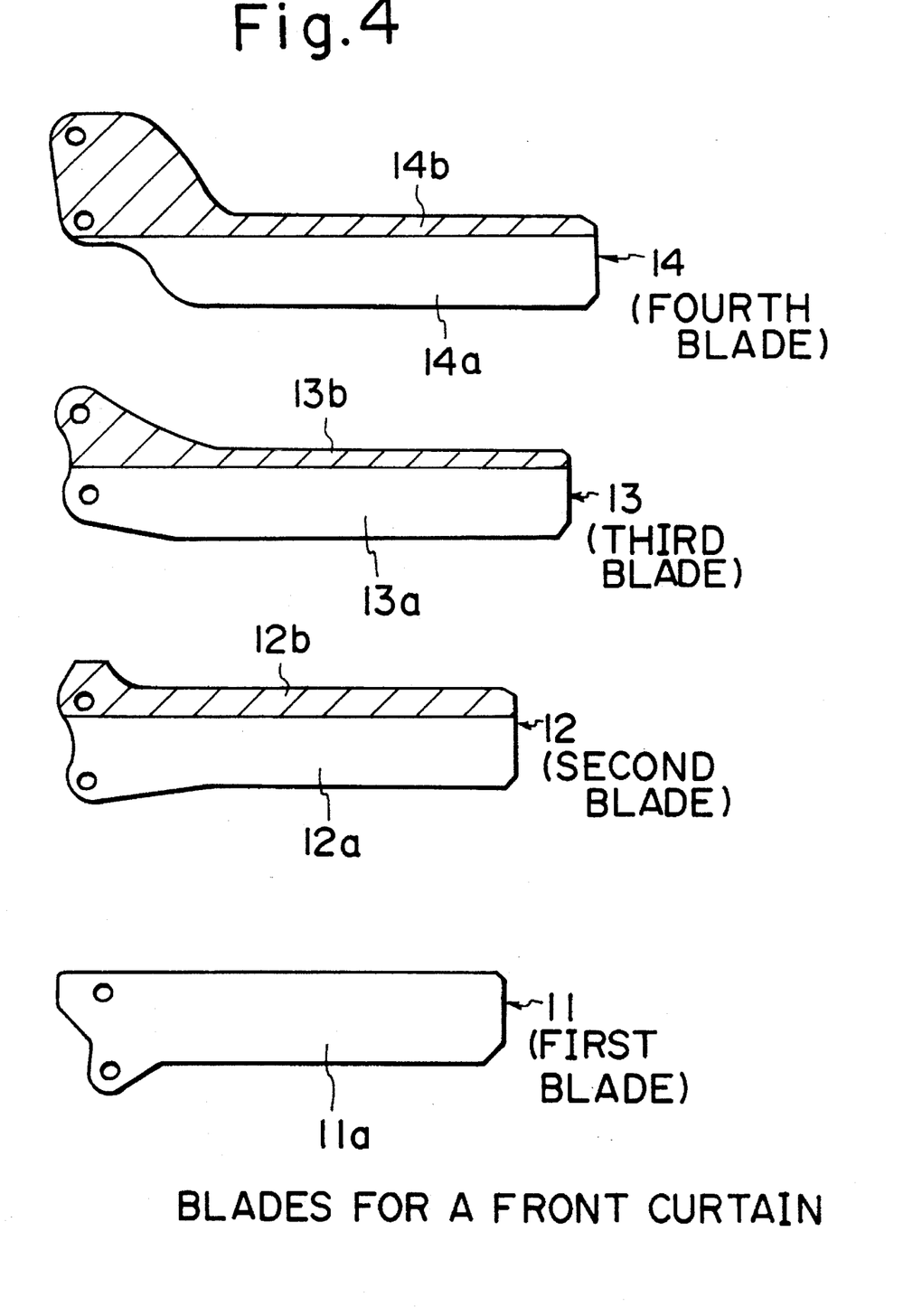
FIG. 4 is a disassembled view of each of the shielding blades constituting the front curtain of the focal plane shutter according to a second embodiment of the present invention.

This second embodiment is the same as the first embodiment described above, except for that blackening painting was additionally applied to (or low reflection rate surface was additionally provided on) the lens-side face, in whole or in part, of the overlapped region of the divided blades 11–14, or shielding blades, in a developed state.

[Third Embodiment]

In this third embodiment, where appearance of the entire shutter is similar to that of FIG. 1, the divided blades are made of CFRP (Carbon Fiber Reinforced Plastics). In preparing the divided blades, whitening painting, 3–6 micron was applied to one surface, in whole, of each of the divided blades 11–14 that constitutes the lens-side surface of the divided blades, whereby the high reflection rate surfaces 11a–14a was formed. The film-side surface and edge surface of the divided blades 11–14 were left unpainted, whereby the low reflection rate surfaces 11b–14b was formed.

In this case, though the low diffused reflection rate surfaces 11b–14b comprise the unpainted CFRP material surface, no influence to light leakage between curtains can be seen since the rate of diffused reflection of the surface is not more than 5%.

Then, the edge surfaces of the divided blades were respectively lightly ground with emery paper of grain fineness number 150 or 400, 600, and 1200. By doing this, protrusions or dents greater than 10 micron dia. or 10×10 square on the slit-forming surface were removed.

In these second and third embodiments, the shutters were assembled into an actual camera and tested with actual photographing, whereby, as a result, no light leakage between curtains was observed.

Implementation of the present invention is not limited to the embodiments described above, but various changes and modifications to such embodiments will be apparent to those skilled in the art. For example, this focal plane shutter according to the present invention is not limited to shutters responding to TTL automatic light adjustment device, but can be applied to all the shutters equipped with high reflection rate surfaces for measurement of shutter surface reflection.

Furthermore, since, as clearly seen in FIG. 3, the low diffused reflection rate surface 14b, which does not face any lens-side surface of an adjacent shielding blade, does not contribute to the prevention of light leakage between curtains, the surface 14b may be either low reflection surfaced or not. In addition, in the case where the overlapping manner of adjacent shielding blades in a developed state, differs from FIG.3 in that, for example, the shielding blade 12 is disposed on the lens side of the shielding blade 11, only surfaces 12b–14b may be selected to be low diffused reflection rate surfaced. Alternately, there can be a case where the rates of diffused reflection of the rear curtain may be adjusted, depending on the positional relationship between the front and rear curtains. In short, the requirements for the arrangement is that the rates of diffused reflection of a curtain that is positioned on the lens side in a developed state, may be adjusted.

As described above, according to the present invention, in a focal plane shutter of a camera conducting TTL multi-pattern light adjustment, the lens-side surface of shielding blades is adapted to have a rate of diffused reflection that does not cause light leakage between curtains depending on the overlapped regions of shielding blades. Thus, light leakage between curtains can be effectively prevented according to the required shutter performance. Besides, ample quantity of reflected light from the shielding blades originated by preliminary flashing, can be obtained that is required for TTL multi-pattern light adjustment.

Furthermore, in the case where the overlapped regions of divided blades, or shielding blades, are arranged to have low diffused reflection rate surfaces, reflection in the overlapped regions of the shielding blades can be restrained, whereby light leakage between curtains can be prevented more effectively.

In addition, in the case where the shielding blades constitute slit-forming blades, unevenness of exposure can be prevented by arranging the slit-side edge surface of the slit-forming blades to be an even surface without unevenness not less than 30 micron.

Furthermore, even if the gap between the surfaces of the shielding blades is broad due to the warp of the shielding blades to a considerable extent, light leakage between curtains can be effectively prevented. As a result, even the shielding blade which warps greatly can be assembled in a focal plane shutter, and consequently, the reduction in cost can be achieved.

We claim:

1. A focal plane shutter of a camera for conducting TTL multi-pattern light adjustment, which controls a quantity of light to an aperture of said camera, comprising:

a plurality of shielding blades for covering said aperture in a developed position, said shielding blades each having at least one edge thereof overlapped by one of said shielding blades immediately adjacent thereto in said developed position, said overlapping edge having a predetermined minimum overlap width in a region opposed to said aperture, said shielding blades each having the lens-side surface thereof formed to be light reflective having a rate of diffused reflection, and said rate of diffused reflection being set within a range according to said predetermined minimum overlap width, such that TTL multi-pattern light adjustment is enabled and no light leakage between said shielding blades occurs.

2. A focal plane shutter according to claim 1, wherein said rate of diffused reflection of said lens-side surface of said plurality of shielding blades is set to be within a range of 7 to 15% when said predetermined minimum overlap width in an aperture area is not less than 1.5 mm and not more than 2.5 mm, and said rate of diffused reflection of said lens-side surface of said plurality of shielding blades is set to be within a range of 15 to 22% when said predetermined minimum overlap width is not less than 2.6 mm and less than 4.5 mm.

3. A focal plane shutter according to claim 1, wherein said rate of diffused reflection of said lens-side surface of said plurality of shielding blades is within a range of 7 to 11%, and said predetermined minimum overlap width is not less than 1.5 mm and less than 2.6 mm.

4. A focal plane shutter according to claim 1, wherein each of said shielding blades has the film-side surface thereof formed to be light-reflective having a rate of diffused reflection, and said rate of diffused reflection of said film-side surface is not more than 6%.

5. A focal plane shutter according to claim 3, wherein each of said shielding blades has the film-side surface thereof formed to be light-reflective having a rate of diffused reflection, and said rate of diffused reflection of said film-side surface is not more than 6%.

6. A focal plane shutter of a camera for conducting measurement of shutter surface reflection, comprising:

a plurality of shielding blades for covering said aperture in a developed position, said shielding blades each having at least one edge thereof overlapped by one of said shielding blades immediately adjacent thereto in said developed position, said overlapping edge having a predetermined minimum overlap width in a region opposed to said aperture, said shielding blades each having a lens-side surface thereof formed to be light reflective having a rate of diffused reflection, said rate of diffused reflection being set within a range according to said predetermined minimum overlap width such that no light leakage between said shielding blades occurs; wherein said rate of diffused reflection of said lens-side surface of said plurality of shielding blades is set to be within a range of 7 to 15% when said predetermined minimum overlap width in an aperture area is not less than 1.5 mm and not more than 2.5 mm, and said rate of diffused reflection of said lens-side surface of said plurality of shielding blades is set to be within a range of 15 to 22% when said predetermined minimum overlap width is not less than 2.6 mm and less than 4.5 mm.

7. A focal plane shutter according to claim 6, wherein each of said shielding blades has a film-side surface thereof formed to be light-reflective having a rate of diffused reflection of said film-side surface that is not more than 6%.

8. A focal plane shutter of a camera for conducting measurement of shutter surface reflection, comprising:

a plurality of shielding blades for covering said aperture in a developed position, said shielding blades each having at least one edge thereof overlapped by one of said shielding blades immediately adjacent thereto in said developed position, said overlapping edge having a predetermined minimum overlap width in a region opposed to said aperture, said shielding blades each having a lens-side surface thereof formed to be light reflective and having a rate of diffused reflection, said rate of diffused reflection being set within a range according to said predetermined minimum overlap width such that no light leakage between said shielding blades occurs; wherein said rate of diffused reflection of said lens-side surface of said plurality of shielding blades is within a range of 7 to 11%, and said predetermined minimum overlap width is not less than 1.5 mm and less than 2.6 mm.

9. A focal plane shutter according to claim 8, wherein each of said shielding blades has a film-side surface thereof formed to be light-reflective having a rate of diffused reflection of said film-side surface that is not more than 6%.

* * * * *